Oct. 19, 1926.
A. E. PECK ET AL
AIRPLANE
Filed Feb. 5, 1925
1,603,711
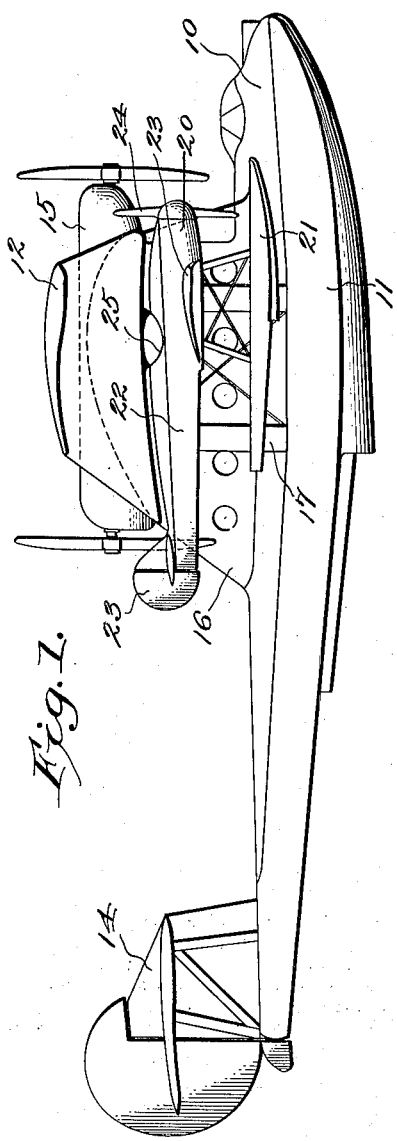
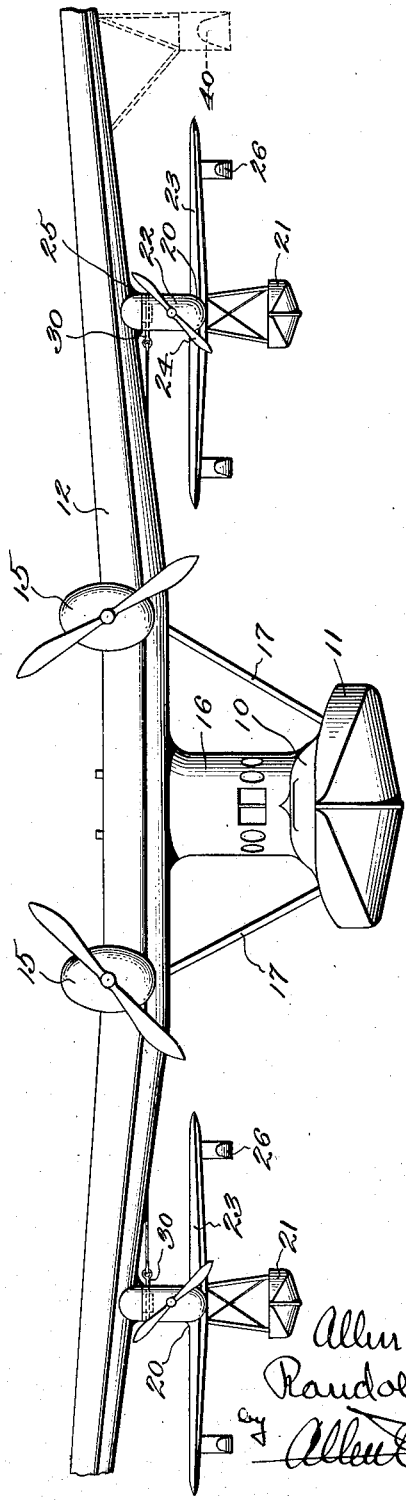

Patented Oct. 19, 1926.

1,603,711

UNITED STATES PATENT OFFICE.

ALLEN E. PECK, OF WASHINGTON, DISTRICT OF COLUMBIA, AND RANDOLPH F. HALL, OF ITHACA, NEW YORK; SAID PECK ASSIGNOR, BY MESNE ASSIGNMENTS, OF ONE-FOURTH TO THEODORE P. HALL, OF WALLINGFORD, CONNECTICUT, AND OF ONE-FOURTH TO PAUL D. WILSON, OF ITHACA, NEW YORK.

AIRPLANE.

Application filed February 5, 1925. Serial No. 6,990.

This invention relates to certain improvements in airplanes; and the nature and objects of the invention will be readily recognized and understood by those skilled in the arts involved in the light of the following explanation and detailed description of the accompanying drawings illustrating what we at present consider to be the preferred embodiments or aerodynamical and mechanical expressions of the invention from among various other forms, arrangements, combinations and constructions of which the invention is capable within the spirit and scope thereof.

The invention is directed to that general type of aircraft which embodies a mother or carrier craft and auxiliary craft mounted thereon and carried thereby; and more particularly deals with and is adapted for application to an embodiment in such craft when the mother or carrier craft and the auxiliary craft are of the heavier-than-air or airplane types. With a mother or carrier craft and auxiliary craft of the airplane type, the mother craft is necessarily of relatively large size and power and formed with a supporting surface or wings of comparatively great span, and where a series of auxiliary craft are employed they are generally preferably mounted on and carried by the supporting surface or wings in balanced relation thereon at opposite sides of the longitudinal axis of the mother craft. The relatively great span of the wings or supporting surface of such a mother craft with the added weight of the auxiliary craft mounted thereon tends to decrease the lateral equilibrium and stability of the mother craft in taking off and landing with the auxiliary craft mounted thereon, while increasing the possibility of engaging or striking the wing tips with resulting damage to the wing and to the mother craft and auxiliary craft thereon, as will be readily recognized by those familiar with the operation of aircraft of the airplane types.

Therefore, one of the main and basic objects of this invention is to reduce and practically eliminate the possibility of engaging or striking the wing tips with mother craft of the airplane types under normal landing and take-off conditions, by designing and mounting auxiliary craft of the airplane type on the wings of the mother craft, so that the landing or displacement gear of the auxiliary craft will engage upon loss of lateral equilibrium in taking off and landing with the mother craft, and thus prevent the wings of the mother craft from striking.

Another object of the invention is to provide auxiliary craft which in mounted position on a mother or carrier craft, form a part of the landing or displacement gear of the mother craft.

Another object of the invention is the provision of a mother or carrier craft of the airplane type, with auxiliary craft of the airplane type mounted on and suspended from the wings of the mother craft and so designed that in mounted position they form elements of the mother airplane landing or displacement gear to prevent engagement or striking of the mother craft wings in taking off and landing.

A further object of the invention is to provide a compact and efficient design and mounting of auxiliary airplanes on a mother or carrier craft of the airplane type, in which design the auxiliary airplanes are mounted suspended from the mother craft wings at opposite sides of the longitudinal axis in balanced relation and are so designed and relatively arranged with respect to the wings from which suspended that they form elements of the mother craft landing gear for engaging the ground or other surface to prevent the wings from striking upon loss of lateral equilibrium in taking off and landing.

With the foregoing general objects, and certain other objects and results in view, which other objects and results will be readily apparent to those skilled in the aeronautical art, the invention consists in certain novel features in design and in construction and arrangement of elements as will be more fully and particularly referred to and specified hereinafter.

Referring to the accompanying drawings, in which similar reference numerals indicate corresponding elements:

Fig. 1 is a more or less diagrammatical view in side elevation of a mother craft and auxiliary aircraft of the water types, with the auxiliary craft designed and mounted in accordance with the invention to form elements of the mother craft displacement gear.

Fig. 2, is a view, more or less diagrammatical, in front elevation of the mother craft and auxiliary craft disclosed in Fig. 1.

One possible mechanical and aerodynamical embodiment and application of the invention is disclosed in the accompanying drawings and described herewith, in which the mother or carrier craft and the auxiliary craft mounted thereon are of the water type of heavier-than-air craft. However, the illustrated embodiment is presented purely by way of example and not of limitation, for the purpose of setting forth and explaining the principles and the various features of the invention, and the type of aircraft disclosed is selected because the problems and the conditions solved and overcome by the invention are met with therein in a high degree and hence such type serves to more clearly bring out and exemplify the results and advantages of the invention. It will be apparent, however, to those skilled in this art that the principles and features of the invention are not confined to the particular type of aircraft or the exact embodiment of the invention, shown herewith, but are likewise applicable to other embodiments and with the use of other types of aircraft.

In the particular example of the invention shown in the accompanying drawings, the mother or carrier craft is of the heavier-than-air water type, and embodies relatively large flying boat 10 having the hull or body 11, monoplane wing or supporting surface 12, tail unit or empennage 14, and the power units 15 for propelling the same, all arranged in accordance with general conventional design practice. The hull 11 is of the usual general type of flying boat hull and forms the landing and take off, or displacement gear for the craft, as will be readily understood. The monoplane wing 12, in the present instance, is of the relatively thick section internally braced cantilever type, and is mounted and supported at the center section thereof on and across a superstructure 16 forming a cabin in upward continuation of the hull 11. The power units 15 are mounted on the wing 12 at opposite sides of the cabin or hull superstructure 16, and struts or brace members 17 extend from the wing 12 below the power units to opposite sides of the hull 11, in order to transmit the power unit loads from the wing to the hull 11.

The flying boat 10, so designed, provides and forms a mother or carrier craft upon which auxiliary craft are mounted and carried for release and detachment therefrom. The design and arrangement of the flying boat 10, with the relatively large span monoplane wing 12 of the cantilever type having a minimum of exterior bracing, lends itself particularly for mounting of the auxiliary craft on the wing 12 removed from the structure at the center section thereof. With the relatively great span of the monoplane wing 12 and the mounting thereof at considerable elevation above the displacement gear formed by the hull, tends to render the flying boat 10 laterally unstable in landing and taking off, which tendency will be increased by the added weight of the auxiliary craft when mounted on the wing at points removed from the longitudinal axis of the craft 10. The foregoing is particularly true with aircraft of the flying boat type having the single body centrally disposed displacement gear formed by the hull thereof, as in the example herewith, where a sufficient metacentric height may not exist to maintain the desired floating equilibrium. Hence, the mother craft formed by the relatively large flying boat 10 having the monoplane wing, may have the tendency in taking off and landing to lose lateral equilibrium and strike or engage a wing tip with possible resulting injury to the craft.

According to the invention, auxiliary craft 20 of the heavier-than-air water type, in the present example taking the form of single pontoon seaplanes, are provided for detachable mounting on the wing 12 of the flying boat mother craft 10. These auxiliary seaplanes 20, each embody the single central pontoon 21 forming the displacement gear in the usual manner, the body or fuselage 22 supported in elevated position above the pontoon 21, and the monoplane wing 23 extending from opposite sides of the fuselage 22. A tail assembly or empennage 23 (see Fig. 1) is disposed at the rear or after end of the fuselage 22 and a tractor propeller 24 at the forward end of the fuselage is driven by any suitable power plant (not shown), all in the more or less conventional manner familiar in this art. The fuselage 22 of each auxiliary seaplane is provided with the usual cockpit 25, and preferably, wing pontoons 26 are mounted adjacent the tips of the wing 23, for the usual purpose.

The auxiliary craft 20 are mounted suspended from and beneath the wing 12 of the mother craft 10, in balanced relation on opposite sides of the longitudinal axis of the mother craft and spaced outwardly on the wing 12 from the center section thereof and the power units 15 mounted thereon, as will be readily understood by reference to Fig. 2 of the accompanying drawings.

In the present instance two auxiliary craft 20 are employed, although it is to be understood that the invention is not limited to any specific number of auxiliary craft, which are detachably suspended from the wing 12 of the mother craft in balanced relation on opposite sides of the longitudinal axis thereof with the displacement gear or central pontoons 21 of each auxiliary craft disposed a distance beneath wing 12. The auxiliary craft 20 are detachably mounted on the wing 12 by any suitable or desired means or mechanism diagrammatically shown at 30 in Fig. 2 of the drawings, through the medium of which they may be detached and released from the mother craft in flight. The construction and arrangement of the detachable mounting and release mechanism 30 forms no part of the present invention and it is not deemed necessary to make a detail disclosure thereof herein.

Each auxiliary seaplane 20 is suspended from the wing 12 of the mother craft in position for flight therefrom upon release by the mechanism 30, and is disposed outwardly on the wing adjacent a tip thereof, in such a relative position with respect to the wing 12 and the hull 11 forming the displacement gear of the mother craft 10, that the pontoon 21 forming the displacement gear of the auxiliary craft will in mounted position provide in effect a wing pontoon of the mother craft. By this mounting and arrangement of the auxiliary seaplanes 20 adjacent the wing tips of the mother craft, loss of lateral equilibrium in taking off and landing with the mother craft and auxiliary craft mounted thereon, will cause the pontoons 21 of the auxiliary craft to engage the surface of the water in advance of the wing tips and arrest the wing movement in the usual manner to prevent the same from contacting or striking the water with possible damage or injury thereto, as will be readily understood. In the case of heavier-than-air water types of craft, as in the example herewith, the auxiliary seaplanes 20 not only function in taking off and landing but during loss of floating equilibrium by the flying boat mother craft while at rest on the water. Thus, the auxiliary craft 20 suspended in the position referred to from the wing 12 of the mother craft 10, form elements of the landing or displacement gear of the mother craft, which in the case of craft of the water types, as in the example shown, will be to form the wing pontoon elements of the mother craft landing or displacement gear.

If desired or found expedient the wing 12 of the mother craft 10, may be provided with the fixed conventional wing pontoon for functioning with the auxiliary craft 20 detached and removed, such for instance as the wing pontoon 40 indicated by dotted lines in Fig. 2 of the drawings. Such fixed pontoons 40 are mounted suspended from the wing adjacent the tips, respectively, and located spaced outwardly from the mounted position of the auxiliary craft 20, so that with the auxiliary craft 20 in mounted position on the wing the pontoons 40 are rendered inoperative by the auxiliary craft which perform the functions of wing pontoons, in the manner hereinbefore explained.

While in the illustrated embodiment of the invention, the mother craft 10 and the auxiliary craft 20 are of the water type with the auxiliary craft forming wing pontoons of the mother craft in mounted position thereon, the invention contemplates and includes embodiment in and application to a mother craft and auxiliary craft of the land types, as will be readily apparent and understood. Where the principles and features of the invention are presented by craft of the land types, the relative arrangement and mounting thereof will substantially conform to that disclosed by the water types of the example herewith but instead of the hull of the mother craft 10 and pontoons of the auxiliary craft 20, landing gear of the land type will be substituted, and the auxiliary craft landing gear in mounted position on the mother craft form wing skids for the mother craft wings. Hence, there is no desire or intention to limit the invention to the water type of craft shown in the accompanying drawings and described herewith, as it is likewise applicable to the land types and various designs and types of aircraft generally, of both the land and water types, or combinations thereof.

The term "airplane" wherever it appears in the foregoing description and in the appended claims, is used in the broad, generic sense to include any and all aircraft of the heavier-than-air type whether adapted for land or water, or for both land and water use, while the term "aircraft" is used in the generic sense to include both the heavier-than-air and the lighter-than-air types. The term "landing-gear" is employed in the appended claims to include all types and forms of gear for taking off, landing, and supporting the airplane in landed position, whether of the land or water types, or a combination thereof.

It is also evident that various changes, modifications, variations, and substitutions might be resorted to without departing from the spirit and scope of our invention, and hence we do not wish or intend to limit ourselves to the exact and specific disclosures hereof.

Desiring to protect our invention in the broadest manner legally possible, what we claim is:

1. In combination, a mother aircraft including a landing gear, and an auxiliary aircraft mounted thereon and forming an element of the mother craft landing gear.

2. In combination, a mother aircraft including a landing gear, and a series of auxiliary aircraft detachably mounted thereon in position for release and flight therefrom, the said auxiliary aircraft in mounted position providing elements of the mother craft landing gear.

3. In combination, an airplane forming a mother craft, and an auxiliary airplane mounted on the mother airplane and forming an element of the landing gear thereof.

4. In combination, a mother airplane including a landing gear therefor, and an auxiliary airplane including a landing gear mounted on said mother airplane with the auxiliary airplane landing gear providing a supplemental element of the mother airplane landing gear.

5. In combination, a mother airplane including a wing and a landing gear, and an auxiliary airplane including a landing gear mounted on the wing of the mother airplane with the auxiliary airplane landing gear forming a supplemental element of the mother airplane landing gear.

6. In combination, a mother airplane, and an auxiliary airplane detachably suspended from a wing of the mother airplane with the auxiliary airplane landing gear providing a surface engaging element to protect the mother airplane wing.

7. The combination with a mother airplane and a wing thereof, of an auxiliary airplane mounted on the wing and forming a surface engaging element to protect the wing from contact.

8. In combination, a mother airplane including a wing thereof, and auxiliary airplanes mounted on the mother airplane wing adjacent the tips thereof, respectively, in position forming surface engaging elements to prevent the wing from striking upon loss of lateral equilibrium by the mother airplane.

9. In combination, a mother airplane including the landing gear and a wing, and auxiliary airplanes including the landing gear thereof, suspended from said wing adjacent opposite ends thereof, respectively, with the landing gear of the auxiliary airplanes depending downwardly and forming elements of the mother airplane landing gear.

10. In combination, a motor airplane including the landing gear and a wing, and auxiliary airplanes including the landing gear thereof, detachably suspended from the mother airplane wing adjacent opposite ends thereof, respectively, in position for release and flight from the mother airplane, the landing gear of the auxiliary airplanes in mounted position depending below the mother airplane wing and disposed with respect thereto and to the mother airplane landing gear to form surface engaging elements to prevent striking of the mother airplane wing.

11. In combination, a mother airplane of the water type, and auxiliary airplanes of the water type mounted thereon and forming elements of the mother airplane displacement gear.

12. In combination with a mother airplane of the water type, auxiliary airplanes of the water type mounted on a wing of the mother airplane and providing wing pontoons therefor.

13. In combination with a mother airplane of the water type including a wing thereof, auxiliary airplanes including displacement gear therefor, suspended from the wing of the mother airplane with the displacement gear of the auxiliary airplanes forming wing pontoons of the mother airplane.

14. In combination, a flying boat including a wing thereof and a hull forming the displacement gear therefor, auxiliary seaplanes suspended from the wing of the flying boat adjacent opposite ends thereof, respectively, in position with the displacement gear of the auxiliary seaplanes providing wing pontoons for the flying boat.

Signed at Washington, District of Columbia, this 5th day of August, 1924.

ALLEN E. PECK.

Signed at Ithaca, New York, this 7th day of Aug., 1924.

RANDOLPH F. HALL.